(12) United States Patent
Cui et al.

(10) Patent No.: US 8,517,633 B2
(45) Date of Patent: Aug. 27, 2013

(54) DEBRIS-FLOW PREVENTION METHOD BY CONTROLLING DEBRIS-FLOW MAGNITUDE AND AVOIDING TO BLOCK MAIN RIVER

(75) Inventors: Peng Cui, Sichuan (CN); Xiaoqing Chen, Sichuan (CN); Yong You, Sichuan (CN); Deji Li, Sichuan (CN); Kai Huang, Sichuan (CN)

(73) Assignee: Institute of Mountain Hazards and Environment, Chinese Academy of Sciences, Chengdu, Sichuan (CN)

( * ) Notice: Subject to any disclaimer, the term of this patent is extended or adjusted under 35 U.S.C. 154(b) by 84 days.

(21) Appl. No.: 13/319,922

(22) PCT Filed: Jan. 25, 2011

(86) PCT No.: PCT/CN2011/070558
§ 371 (c)(1),
(2), (4) Date: Nov. 10, 2011

(87) PCT Pub. No.: WO2012/088775
PCT Pub. Date: Jul. 5, 2012

(65) Prior Publication Data
US 2012/0273046 A1     Nov. 1, 2012

(30) Foreign Application Priority Data
Dec. 31, 2010   (CN) .......................... 2010 1 0617466

(51) Int. Cl.
*F17D 3/00*       (2006.01)

(52) U.S. Cl.
USPC .............................................. 405/60; 405/80

(58) Field of Classification Search
USPC .................................... 405/52, 60, 80; 137/1
See application file for complete search history.

(56) References Cited

U.S. PATENT DOCUMENTS

| 6,926,464 B1* | 8/2005 | Weidmann | 405/40 |
| 2006/0056923 A1* | 3/2006 | Hwang | 405/285 |

* cited by examiner

*Primary Examiner* — Tara M. Pinnock
(74) *Attorney, Agent, or Firm* — Scully, Scott, Murphy & Presser, P.C.

(57) ABSTRACT

The invention discloses a debris-flow prevention method by controlling debris-flow magnitude and avoiding to block main river. This method first adopts the drainage works for delivering debris flow in corporation with the transport of the main river; if the drained sediment cannot be transported by the main river, the blocking works are adopted; and if the sediment still exceeds the delivering capacity, the deposit stopping works are adopted. Compared with the prior art, this invention makes full use of the main river's transport capacity, gives priority to dredging and also reasonably distributes the sediment and deploys the engineering system, so as to realize the safe discharge of debris flow, and avoid the secondary disaster of "barrier lake" caused by the blocking of main river due to excessive discharge of debris flow and fully guarantee the safety of mountain towns, major projects and infrastructure located at the mouth of debris flow gully.

7 Claims, No Drawings

DEBRIS-FLOW PREVENTION METHOD BY CONTROLLING DEBRIS-FLOW MAGNITUDE AND AVOIDING TO BLOCK MAIN RIVER

FIELD OF THE INVENTION

The invention relates to a debris flow prevention technology and particularly a debris-flow prevention method by controlling debris-flow magnitude and avoiding to block main river which is based on the adjusting unconsolidated soil supply and debris-flow movement from upstream to downstream and is also a planning and design method for the debris-flow prevention project system.

BACKGROUND OF THE INVENTION

Debris-flow disaster is one of the major types of geological disasters in China. Currently, more concern is paid to the secondary disasters which result from the blockage of the main river due to debris flow, e.g. barrier dam and dammed lake formed by debris-flow deposit inundating the upstream areas. On Aug. 8, 2010, a large debris flow broke out at Sanyanyu, Zhouqu County, Gansu Province, which filled up and buried the county town, blocked the main river—Bailong River to form a dammed lake, inundated nearly half of the county town and caused serious casualties and property loss. On Aug. 13, 2010, a large debris flow broke out at Wenjiagou Village, Qingping Township, Mianzhu City, Sichuan Province, which blocked the main river, caused more than ten death and missing filled up and buried a lot of reconstructed civilian buildings after the Wenchuan Earthquake.

With the economic development of mountainous areas and the deepening of Western Development of state policy, the demand for the debris-flow control project becomes stronger and stronger. The influence of main river transport capacity was rarely considered in the past debris flow prevention design. Due to the imbalanced distribution of amount of debris borne by each countermeasure structure, even though the debris-flow prevention works like drainage canal, sediment storage dam and deposit stopping field were built, the situation of main river blocked by debris flow still appeared and even this situation was aggravated due to excess drainage.

To prevent the occurrence of secondary disasters caused by the blockage of the main river due to debris flow, the main river transport capacity must be fully considered in the debris-flow prevention design. The debris-flow substance must be rationally distributed along the way and the debris-flow body which is drained beyond the main river transport capacity must be avoided to enter into the main river and thus cause flood inundation or outburst disasters, so as to safeguard the safety of towns, major projects and infrastructure at the mouth of debris flow gully.

CONTENTS OF THE INVENTION

The purpose of the invention is to provide a debris flow prevention method by controlling debris-flow magnitude and avoiding to block main river based on the distribution of debris-flow substance along the way according to the shortcomings of prior art and the situation that the dammed dam and dammed lake formed by debris flow inundate the upstream areas as the blockage of the main river due to debris flow often occurs in the mountainous areas. The corresponding engineering measures are taken for the prevention and control of debris-flow magnitude through adjusting unconsolidated soil supply and debris-flow movement from upstream to downstream based on that the transport capacity of the main river is fully used, so as to realize the safe drainage of debris flow, avoid the occurrence of the secondary disasters like dammed lake resulting from the blockage of the main river due to excess drainage of debris flow and fully safeguard the safety of mountain town, major projects and infrastructure at the mouth of debris flow gully.

To achieve the above purpose, the technical solution of the invention is shown as follows:

The invention relates to a debris flow prevention method by controlling debris-flow magnitude and avoiding to block main river which is based on the distribution of debris-flow substance along the way, and its main technological thought is shown as follows: the transport capacity of the main river is fully used and the concept of giving priority to dredging is embodied, and the peak discharge of debris flow which is drained to the main river through the drainage works can be determined according to the transport capacity of the main river; as the drainage works, blocking works and deposit stopping works for the prevention and control of debris flow, the construction difficulty of blocking works is great due to traffic inconvenience and the deposit stopping works occupies a larger area, so the use of drainage works is first considered in the prevention and control of debris flow. Then, based on the distribution of debris-flow substance along the way and the material balance, the debris-flow prevention project system is rationally allocated: if the debris-flow substance can be transported to the downstream area from the main river, only the drainage works is adopted for the prevention and control of debris flow; based on the drainage works, if still some debris-flow substance cannot be transported to the downstream area from the main river, both the drainage works and the blocking works are adopted; based on the drainage works and blocking works, if the debris-flow substance still cannot be completely transported, the combination of drainage works, blocking works and deposit stopping works is adopted.

Specially speaking, the invention relates to a debris-flow prevention method by controlling debris-flow magnitude and avoiding to block main river. While the transport capacity of the main river is fully used (i.e. the maximum discharge of debris flow which can be drained to the main river is fully used when the main river is not blocked), corresponding engineering measures are taken for the prevention and control of debris flow through rational distribution of debris-flow substance along the way (the discharge of debris flow substance which is distributed to the drainage works, blocking works and deposit stopping works for consumption), and the steps are shown as follows:

Determine the peak discharge $Q_{Total}$ of debris flow under the design standard according to the floodmark investigation of historical debris-flow disasters or hydrological calculation of small watershed.

B. Determine the peak discharge $Q_{Drainage}$ of debris flow which can be drained to the main river via the drainage canal of debris flow according to the transport capacity of the main river.

C. Only adopt the drainage works (mainly referring to the drainage canal of debris flow) for the prevention and control of debris flow (the said debris-flow prevention method is terminated and Step D and the following steps will not be carried out) when $Q_{Total} \leq Q_{Drainage}$ (i.e. the peak discharge $Q_{Total}$ of debris flow under the design standard is less than or equal to the peak discharge $Q_{Drainage}$ of debris flow which can be drained to the main river via the drainage canal of debris flow, or all the debris-flow substance can be transported to the downstream area from the main river via the drainage works);

and adopt both the drainage works and the blocking works (i.e. the blocking works is combined with the drainage works for the prevention and control of debris flow) when $Q_{Total} > Q_{Drainage}$ (i.e. the peak discharge $Q_{Total}$ of debris flow under the design standard is more than the peak discharge $Q_{Drainage}$ of debris flow which can be drained to the main river via the drainage canal of debris flow, or all the debris-flow substance can not be transported to the downstream area from the main river via the drainage works), and then take the Step D;

D. Determine the peak discharge $Q_{Block}$ of debris flow which is reduced through stability and blocking according to the blocking works like sediment storage dam, check dam and bed consolidation dam at the upper and lower reaches of the watershed;

E. Adopt both the drainage works and the blocking works for the prevention and control of debris flow (the said debris-flow prevention method is terminated and Step F will not be carried out) when $Q_{Total} \leq Q_{Drainage} + Q_{Block}$ (i.e. the peak discharge $Q_{Total}$ of debris flow under the design standard is less than or equal to the peak discharge $Q_{Drainage}$ of debris flow which can be drained to the main river via the drainage canal of debris flow plus the peak discharge $Q_{Block}$ of debris flow which is reduced through stability and blocking, or the debris-flow substance can be completely consumed by the drainage works and the blocking works); and simultaneously adopt the drainage works, blocking works and deposit stopping works when $Q_{Total} > Q_{Drainage} + Q_{Block}$ (i.e. the peak discharge $Q_{Total}$ of debris flow under the design standard is more than the peak discharge $Q_{Drainage}$ of debris flow which can be drained to the main river via the drainage canal of debris flow plus the peak discharge $Q_{Block}$ of debris flow which is reduced through stability and blocking, or the debris flow substance can not be completely transported by the drainage works and the blocking works) and then take the Step F;

F. Determine the peak discharge $Q_{Deposit}$ entering into the deposit stopping works with the calculation formula of $Q_{Deposit} = Q_{Total} - Q_{Drainage} - Q_{Block}$ according to the material balance principle of the debris-flow watershed as well as the peak discharge $Q_{Total}$ of debris flow obtained in Step A under the design standard, the peak discharge $Q_{Drainage}$ of debris flow which can be drained to the main river via the drainage canal of debris flow and obtained in Step B as well as the peak discharge $Q_{Block}$ of debris flow which is reduced through stability and blocking and obtained in Step D.

When only the drainage works is adopted for the prevention and control of debris flow, the aforesaid $Q_{Total}$ can be used as the designed value of peak discharge in the drainage works. When both the drainage works and the blocking works are adopted, the aforesaid $Q_{Drainage}$ can be used as the designed value of peak discharge in the drainage works; and $(Q_{Total} - Q_{Drainage})$ can be used as the calculated value of reduced peak discharge in the blocking works; and according to the fortification standard of the prevention project, a safety factor k can be increased in the actual design of the blocking works, so the designed value of reduced peak discharge in the blocking works is $(Q_{Total} - Q_{Drainage}) \times k$. When the drainage works, blocking works and deposit stopping works are simultaneously adopted, the aforesaid $Q_{Drainage}$ can be used as the designed value of peak discharge in the drainage works, the aforesaid $Q_{Block}$ can be used as the calculated value of reduced peak discharge in the blocking works and the aforesaid $Q_{Deposit}$ can be used as the calculated value of peak discharge in the deposit stopping works; and according to the fortification standard of the prevention project, a safety factor k can be increased in the actual design of the blocking works and deposit stopping works, so the designed value of reduced peak discharge in the blocking works is $Q_{Block} \times k$ and the designed value of peak discharge in the deposit stopping works is $Q_{Deposit} \times k$. The said k is a safety factor, which is determined by the importance of the protected object, and its specific value should be favorable for increasing the project safety. As for the common protected object, $1.0 \leq k < 1.1$; as for the quite important protected object, $1.1 \leq k < 1.2$; as for the extremely important protected object, $1.2 \leq k$.

In the aforesaid Step B, based on the transport capacity of the main river, the peak discharge $Q_{Drainage}$ of debris flow which is drained to the main river via the drainage canal of debris flow can be determined, and the steps are shown as follows: determine the peak discharge $Q_M$ of the main river under the design standard through investigation or hydrological calculation of small watershed, and then calculate the peak discharge $Q_{Drainage}$ of debris flow which is drained to the main river via the drainage canal of debris flow, with the calculation formula (derived from the discharge discriminant of the main river blocked by debris flow, which is put forward by He Yiping, et. al.: $\ln F_R - 0.883(1 - \cos \theta)^2 - 2.587\gamma < -8.572$ and $F_R = Q_m / Q_d$) shown as follows:

$$Q_m = Q_M / B$$

$$Q_d = Q_m / e^{0.883(1 - \cos \theta)^2 + 2.587(\gamma_c / \gamma_w) - 8.572}$$

$$Q_{Drainage} = Q_d \times b$$

Wherein:

$Q_m$—Unit discharge of the main river (volume of fluid body flowing through the unit length of the main river within the unit time), m$^3$/s/m (cubic number of fluid body flowing through each meter of the main river per second);

$Q_M$—Peak discharge of main river under the design standard, m$^3$/s;

B—Width of the main river, m, measured by the position of drainage canal entering into the main river;

$Q_d$—Unit discharge of drainage canal of debris flow (volume of fluid body flowing through the unit length of the drainage canal within the unit time), m$^3$/s/m (cubic number of fluid body flowing through each meter of the drainage canal per second);

$\theta$—Included angle between drainage canal of debris flow and main river, °, measured by the included angle between the planned strike of drainage canal on the debris flow fan and the main river;

$\gamma_c$—Density of debris flow, kN/m$^3$, determined through the investigation of historical disasters or the particle grading of sedimentary soil;

$\gamma_w$—Flow density of main river, 10 kN/m$^3$;

$Q_{Drainage}$—Peak discharge of debris flow which is drained to the main river via the drainage canal of debris flow, m$^3$/s;

b—Proposed width of drainage canal of debris flow, m, proposed as per the drainage canals in the similar successful prevention projects.

In the above Step A, the peak discharge $Q_{Total}$ of debris flow is determined under the design standard according to the floodmark investigation of historical debris-flow disasters and the steps are shown as follows: first select the gully section with straight channel, uniform gully bed slope and balanced sediment from the middle flowing section of the debris-flow watershed; then measure the maximum floodmark height of the historical debris flow, calculate the overflowing area S, measure the gully bed slope J, and calculate the debris-flow velocity V by the hydrological method; finally determine the peak discharge of debris flow under the design standard according to $Q_{Total} = S \times V$.

In the above Step A, the peak discharge $Q_{Total}$ of debris flow is determined under the design standard by the hydrological calculation method of small watershed (the method of completing the square is generally adopted), with the calculation formula shown as follows:

$$Q_{Total}=(1+\phi_c)D_uQ_b;\ \phi_c=(\gamma_c-\gamma_w)/(\gamma_s-\gamma_c)$$

Wherein:

$Q_{Total}$—Peak discharge of debris flow under the design standard, m³/s;

$\Phi_c$—Coefficient of peak discharge increase of debris flow;

$D_u$—Blockage factor of debris flow gully, 1.0~3.0;

$Q_b$—Water flow under the design standard, m³/s, calculated by referring to the hydrologic manuals of all provinces and regions;

$\gamma_s$—Density of solids in debris flow, 27 kN/m³;

$\gamma_c$—Density of debris flow, kN/m³, determined through investigation of historical disasters or the particle grading of sedimentary soil;

$\gamma_w$—Density of water, 10 kN/m³. In the above Step D, the peak discharge $Q_{Block}$ of debris flow which is reduced through stability and blocking is related to many factors such as height of sediment storage dam and check dam, storage capacity and opening size of dam body. Currently, the peak discharge $Q_{Block}$ of debris flow which is reduced through stability and blocking is mainly determined according to experience and is generally taken as $(0.3~0.8)Q_{Total}$.

If compared with the prior art, the beneficial effects of the invention are that: While the transport capacity of the main river is fully used and priority is given to dredging, the measures are taken through the rational distribution of debris-flow substance along the way and the rational allocation of debris-flow prevention project system, so as to realize the safe drainage of debris flow, avoid the secondary disasters like dammed lake resulting from the blockage of the main river due to the excess drainage of debris flow and fully safeguard the safety of mountain town, major projects and infrastructure at the mouth of debris flow gully.

EXEMPLARY EMBODIMENTS

Next, the optimal exemplary embodiments of the invention will be further described.

Exemplary Embodiment I

A debris-flow watershed covers an area of 2.6 km². In a debris-flow prevention method by controlling debris-flow magnitude and avoiding to block main river of the invention, the corresponding engineering measures are taken for the prevention and control of debris-flow magnitude through adjusting debris-flow movement based on that the transport capacity of the main river is fully used, and the steps are shown as follows:

A. The peak discharge $Q_{total}$ of debris flow is determined under the design standard according to the floodmark investigation of historical debris-flow disasters. First select the gully section with straight channel, uniform gully bed slope and balanced sediment from the middle flowing section of the debris-flow watershed; then measure the maximum floodmark height of the historical debris flow, calculate the overflowing area of debris flow S=4.8 m², measure the gully bed slope J=0.15, and calculate the debris-flow velocity V=5.6 m/s by the hydrological method; finally determine the peak discharge $Q_{Total}$=S×V=26.9 m³/s of debris flow under the design standard of 20-year return period.

B. Based on the transport capacity of the main river, the peak discharge $Q_{Drainage}$ of debris flow which is drained to the main river via the drainage canal of debris flow is determined. The peak discharge $Q_M$=420 m³/s of the main river is determined through investigation and calculation under the design standard of 20-year return period and the width of the main river is determined as B=40 m through the position measurement of the drainage canal entering into the main river, so the unit discharge of the main river is $Q_m=Q_M/B$=10.5 m³/s/m. Through analysis on the particle grading of indoor sedimentary soil, the density of debris flow is $\gamma_c$=21 kN/m³ under the design standard of 20-year return period; the flow density of the main river is $\gamma_w$=10 kN/m³; the included angle between the preliminarily planned drainage canal and the main river is θ=60° and the proposed width of drainage canal is b=3.0 m. Therefore, the unit discharge of the drainage canal is $Q_d=Q_m/e^{0.883(1-\cos\theta)^2+2.587(\gamma_c/\gamma_w)-8.572}$=251.8 m³/s/m, and finally the peak discharge of debris flow which is drained to the main river via the drainage canal of debris flow is finally calculated as $Q_{Drainage}=Q_d\times b$=755.4 m³/s.

C. As $Q_{Total}\leq Q_{Drainage}$ is satisfied, only the drainage works is adopted for the prevention and control of debris flow.

The aforesaid $Q_{Total}$ obtained in Step A is used as the designed value of peak discharge in the drainage works, i.e. the designed peak discharge in the said drainage works is 26.9 m³/s.

Exemplary Embodiment II

A debris-flow watershed covers an area of 14.1 km². In a debris-flow prevention method by controlling debris-flow substance transport of the invention, the corresponding engineering measures are taken for the prevention and control of debris flow based on the transport capacity of the main river is fully used through controlling debris-flow substance along its flow course, and the steps are shown as follows:

A. The peak discharge $Q_{Total}$ of debris flow is determined under the design standard according to the hydrological calculation of small watershed. Through the investigation and survey over the historical disasters of this watershed, the density of the 20-year debris flow is determined as $\gamma_c$=20 kN/m³; the density of solids in the debris flow body is $\gamma_s$=27 kN/m³, the water density is $\gamma_w$=10 kN/m³, and the blockage factor of debris flow gully is $D_u$=2.0. By the hydrological calculation method of small watershed, the 20-year water flow is $Q_b$=74.0 m³/s, so the coefficient of peak discharge increase of debris flow is $\phi_c=(\gamma_c-\gamma_w)/(\gamma_s-\gamma_c)$=1.43 and the peak discharge of debris flow is $Q_{Total}=(1+\phi_c)D_uQ_b$=359.6 m³/s under the design standard of 20-year return period.

B. Based on the transport capacity of the main river, the peak discharge $Q_{Drainage}$ of debris flow which is drained to the main river via the drainage canal of debris flow is determined. The peak discharge $Q_M$=150 m³/s of the main river is determined through the hydrological calculation of small watershed under the design standard of 20-year return period and the width of the main river is determined as B=35 m through the position measurement of the drainage canal entering into the main river, so the unit discharge of the main river is $Q_m=Q_M/B$=4.3 m³/s/m. Through investigation and survey over the historical disasters of this watershed, the weight of debris flow is $\gamma_c$=20 kN/m³ under the design standard of 20-year return period; the flow weight of the main river is $\gamma_c$=10 kN/m³; the included angle between the preliminarily planned drainage canal of debris flow and the main river is θ=90° and the proposed width of drainage canal is b=5.0 m. Therefore, the unit discharge of drainage canal is $Q_d=Q_m/e^{0.883(1-\cos\theta)^2+2.587(\gamma_c/\gamma_w)-8.572}$=53.2 m³/s/m, and finally the peak discharge of debris flow which is drained to the main river via the drainage canal of debris flow is calculated as $Q_{Drainage}=Q_d\times b$=265.9 m³/s.

C. As $Q_{Total}>Q_{Drainage}$ is satisfied, the drainage works cannot be only considered for the prevention and control of debris flow, but the blocking works must be increased together with the drainage works, and then Step D should be taken.

D. Through survey over the upper and lower reaches of the watershed, the conditions for the construction of blocking works like check dam and sediment storage dam are satisfied. The peak discharge of debris flow which is reduced through stability and blocking is determined as $Q_{Block}=0.8Q_{Total}=287.7$ m$^3$/s through preliminary estimate.

E. As $Q_{Total} \leq Q_{Drainage}+Q_{Block}$ is satisfied, both the drainage works and the blocking works are adopted for the prevention and control of debris flow.

Based on the principle of maximizing the transport capacity of the main river, the aforesaid $Q_{Total}$ obtained in Step B is used as the designed value of peak discharge in the drainage works, i.e. the designed peak discharge in the said drainage works is 265.9 m$^3$/s; and ($Q_{Total}-Q_{Drainage}$) is used as the designed value of reduced peak discharge in the blocking works. The mouth of debris flow gully has very important protected objects, so the safety factor k is taken as 1.2 and the designed value of reduced peak discharge in the blocking works is determined as $(Q_{Total}-Q_{Drainage}) \times k=112.4$ m$^3$/s, i.e. the designed reduced peak discharge in the blocking works is 112.4 m$^3$/s.

Exemplary Embodiment III

A debris-flow watershed covers an area of 24.1 km$^2$. In a debris-flow prevention method by controlling debris transport of the invention, the corresponding engineering measures are taken for the prevention and control of debris flow based on that the transport capacity of the main river is fully used through controlling debris-flow substance from upstream to downstream, and the steps are shown as follows:

A. The peak discharge $Q_{Total}$ of debris flow is determined under the design standard according to the hydrological calculation of small watershed. Through the investigation and survey over the historical disasters of this watershed, the density of 50-year debris flow is determined as $\gamma_c=21$ kN/m$^3$; the density of solids in the debris flow body is $\gamma_s=27$ kN/m$^3$, the water density is $\gamma_w=10$ kN/m$^3$, and the blockage factor of debris flow gully is $D_u=3.0$. By the hydrological calculation method of small watershed, the 50-year water flow is $Q_b=158.3$ m$^3$/s, so the coefficient of peak discharge increase of debris flow is $\phi_c=(\gamma_c-\gamma_w)/(\gamma_s-\gamma_c)=1.83$ and the peak discharge of debris flow under the design standard of 50-year return period is $Q_{Total}=(1+\phi_c)D_uQ_b=1,344.0$ m$^3$/s.

B. Based on the transport capacity of the main river, the peak discharge $Q_{Drainage}$ of debris flow which is drained to the main river via the drainage canal of debris flow is determined. The peak discharge $Q_M=650$ m$^3$/s of the main river is determined through the hydrological calculation of small watershed under the design standard of 50-year return period and the width of the main river is determined as B=100 m through the position measurement of the drainage canal entering into the main river, so the unit discharge of the main river is $Q_m=Q_M/B=6.5$ m$^3$/s/m. Through investigation and survey over the historical disasters of this watershed, the density of debris flow is $\gamma_c=21$ kN/m$^3$ under the design standard of 50-year return period; the flow density of the main river is $\gamma_w=10$ kN/m$^3$; the included angle between the preliminarily planned drainage canal of debris flow and the main river is $\theta=90°$ and the proposed width of drainage canal of debris flow is b=10.0 m. The unit discharge of drainage canal of debris flow is $Q_d=Q_m/e^{0.883(1-\cos\theta)^2+2.587(\gamma_c/\gamma_w)-8.572}=62.1$ m$^3$/s/m, and finally the peak discharge of debris flow which is drained to the main river via the drainage canal of debris flow is finally calculated as $Q_{Drainage}=Q_d \times b=621.0$ m$^3$/s.

C. As $Q_{Total}>Q_{Drainage}$ is satisfied, the drainage works cannot be only considered for the prevention and control of debris flow, but the blocking works must be increased together with the drainage works, and then Step D should be taken.

D. Through survey over the upper and lower reaches of the watershed, the conditions for the construction of blocking works like check dam and sediment storage dam are satisfied. The peak discharge of debris flow which is reduced through stability and blocking is determined as $Q_{Block}=0.3Q_{Total}=403.2$ m$^3$/s through preliminary estimate.

E. As $Q_{Total}>Q_{Drainage}+Q_{Block}$ is satisfied, the drainage works, blocking works and deposit stopping works are simultaneously adopted for the prevention and control of debris flow, and then Step F is taken.

F. The peak discharge entering into the deposit stopping works is determined as $Q_{Deposit}=Q_{Total}-Q_{Drainage}-Q_{Block}=319.8$ m$^3$/s according to the peak discharge $Q_{Total}$ obtained in Step A under the design standard, the peak discharge $Q_{Drainage}$ which can be drained to the main river via the drainage canal and obtained in Step B as well as the peak discharge $Q^{Block}$ which is reduced through stability and blocking and obtained in Step D.

Based on the principle of maximizing the transport capacity of the main river, the aforesaid $Q_{Drainage}$ obtained in Step B is used as the designed value of peak discharge in the drainage works, i.e. the designed peak discharge in the said drainage works is 621.0 m$^3$/s; the aforesaid $Q_{Block}$ obtained in Step D is used as the calculated value of reduced peak discharge in the blocking works and the aforesaid $Q_{Deposit}$ obtained in Step F is used as the calculated value of peak discharge in the deposit stopping works. The mouth of debris-flow gully has very important protected objects, so the safety factor k is taken as 1.1 and the designed value of reduced peak discharge in the blocking works is determined as $Q_{Block} \times k=403.2 \times 1.1=443.5$ m$^3$/s and the designed value of peak discharge in the deposit stopping works is determined as $Q_{Deposit} \times k=319.8 \times 1.1=351.8$ m$^3$/s, i.e. the designed reduced peak discharge in the blocking works is 443.5 m$^3$/s and the designed peak discharge in the deposit stopping works is 351.8 m$^3$/s.

The invention claimed is:

1. A method for preventing and controlling debris flow, comprising:
 determining a peak discharge $Q_{Total}$ of debris flow in compliance with a design standard, according to the floodmark investigation of historical debris-flow hazards or hydrological calculation of small watershed;
 determining a peak discharge $Q_{Drainage}$ of debris flow which can be drained to a main river via one or more drainage channels of debris flow according to the transport capacity of the main river;
 when $Q_{Total} \leq Q_{Drainage}$, adopting the drainage works for the prevention and control of debris flow ;
 when $Q_{Total}>Q_{Drainage}$, adopting both the drainage works and the blocking works for the prevention and control of debris flow, and determining a peak discharge $Q_{Block}$ of debris flow which is reduced through stability and blocking according to the blocking works at the upper and lower reaches of the watershed;
 when $Q_{Total} \leq Q_{Drainage}+Q_{Block}$, adopting both the drainage works and the blocking works for the prevention and control of debris flow;
 when $Q_{Total}>Q_{Drainage}+Q_{Block}$, adopting the drainage works, blocking works and deposit stopping works for the prevention and control of debris flow, and determining a peak discharge $Q_{Deposit}$ in deposit stopping works with the calculation formula of $$Q_{Deposit}=Q_{Total}-Q_{Drainage}-Q_{Block}.$$

2. The method according to claim 1, wherein:

when the drainage works is adopted for the prevention and control of debris flow, the designed value of peak discharge in the drainage works is $Q_{Total}$;

when both the drainage works and the blocking works are adopted, the designed value of peak discharge in the drainage works is $Q_{Drainage}$ and the designed value of reduced peak discharge in the blocking works is $(Q_{Total}-Q_{Drainage})\times k$;

when the drainage works, blocking works and deposit stopping works are adopted, the designed value of peak discharge in the drainage works is $Q_{Drainage}$; the designed value of reduced peak discharge in the blocking works is $Q_{Block}\times k$, and the designed value of peak discharge in the deposit stopping works is $Q_{Deposit}\times k$;

wherein k is a safety factor, which is determined by a importance level of an object protected from debris flow.

3. The method according to claim 2, wherein for an object of a low importance level, $1.0 \leq k < 1.1$; for an object of a high importance level, $1.1 \leq k < 1.2$; and for an object of an extremely important level, $1.2 \leq k$.

4. The method according to claim 1, wherein based on the transport capacity of the main river, the peak discharge $Q_{Drainage}$ of debris flow which is drained to the main river via the drainage channels of debris flow can be determined by:

determining the peak discharge $Q_M$ of the main river at the junction of debris-flow tributary in compliance with the design standard through investigation or hydrologic calculation of watershed of the main river, and calculating the peak discharge $Q_{Drainage}$ of debris flow which is drained to the main river via one or more drainage canals, with the calculation formula shown as follows:

$$Q_m = Q_M/B$$

$$Q_d = Q_m/e^{0.883(1-\cos\theta)^2 + 2.587(\gamma_c/\gamma_w) - 8.572}$$

$$Q_{Drainge} = Q_d \times b$$

wherein:

$Q_m$—Unit discharge of the main river, m³/s/m;

$Q_M$—Peak discharge of main river in compliance with the design standard, m³/s;

B—Width of the main river, m, measured by the position of drainage canals entering into the main river;

$Q_d$—Unit discharge of drainage channel of debris flow, m³/s/m;

θ—Angle between drainage channel of debris flow and main river, °, measured by the included angle between the planned strike of drainage channel on the debris flow fan and the main river;

$\gamma_c$—Density of debris flow, kN/m³, determined through the investigation of historical hazards or the particle grading of sedimentary soil;

$\gamma_w$—Flow density of main river, 10 kN/m³;

$Q_{Drainage}$—Peak discharge of debris flow which is drained to the main river via the drainage canals of debris flow, m³/s;

b—Proposed width of drainage channel of debris flow, m.

5. The method according to claim 1, wherein the peak discharge $Q_{Total}$ of debris flow is determined in compliance with the design standard according to the floodmark investigation of historical debris-flow hazards by the following steps:

selecting the gully section with straight channels, uniform gully bed slope and balanced sentiment transportation from the middle flowing section of the debris-flow watershed;

measuring the maximum floodmark height of the historical debris flow, calculating the flowing area S, measuring the gully bed slope J, and calculating the debris-flow velocity V by the hydrological method; and determining the peak discharge of debris flow in compliance with the design standard according to $Q_{Total}=S\times V$.

6. The method according to claim 1, wherein the peak discharge $Q_{Total}$ of debris flow is determined in compliance with the design standard by the hydrological calculation method of small watershed, with the calculation formula shown as follows:

$$Q_{Total}=(1+\phi_c)D_u Q_b;\ \phi_c=(\gamma_c-\gamma_w)/(\gamma^s-\gamma_c)$$

wherein:

$Q_{Total}$—Peak discharge of debris flow in compliance with the design standard, m³/s;

$\phi_c$—Coefficient of peak discharge increase of debris flow;

$D_u$—Blockage factor of debris-flow gully, 1.0~3.0;

$Q_b$—Water flow in compliance with the design standard, m³/s, calculated by referring to the local hydrologic manuals (province or region hydrologic manual);

$\gamma_s$—Density of solids in debris flow, 27 kN/m³;

$\gamma_c$—Density of debris flow, kN/m³, determined through the investigation of historical debris-flow events or the particle grading of sedimentary soil;

$\gamma_w$—Density of water, 10 kN/m³.

7. The method according to claim 1, wherein the peak discharge $Q_{Block}$ of debris flow which is reduced through stability and blocking is $(0.3~0.8)Q_{Total}$.

* * * * *